(12) United States Patent
Smith

(10) Patent No.: US 7,008,079 B2
(45) Date of Patent: Mar. 7, 2006

(54) COMPOSITE REFLECTING SURFACE FOR LINEAR LED ARRAY

(75) Inventor: Todd J. Smith, Deep River, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 0 days.

(21) Appl. No.: 10/718,766

(22) Filed: Nov. 21, 2003

(65) Prior Publication Data

US 2005/0111220 A1    May 26, 2005

(51) Int. Cl.
*F21V 1/00* (2006.01)
*F21V 11/00* (2006.01)

(52) U.S. Cl. ............ 362/235; 362/518; 362/545; 362/241; 362/296; 362/346; 362/347; 362/800

(58) Field of Classification Search .......... 362/235, 362/516, 517, 518, 540, 545, 542, 541, 241, 362/296, 346, 347, 800; 359/853, 868, 869
See application file for complete search history.

(56) References Cited

U.S. PATENT DOCUMENTS

| 4,742,432 A | * | 5/1988 | Thillays et al. ............. 361/783 |
| 4,792,717 A | | 12/1988 | Ferenc ........................ 313/113 |
| 4,886,329 A | | 12/1989 | Dziemba ..................... 350/6.5 |
| 5,418,384 A | | 5/1995 | Yamana et al. ................ 257/88 |
| 5,434,754 A | | 7/1995 | Li et al. ........................ 362/31 |
| 6,318,886 B1 | | 11/2001 | Stopa et al. ................. 362/555 |
| 6,320,182 B1 | | 11/2001 | Hubble, III et al. ......... 250/216 |
| 6,328,456 B1 | | 12/2001 | Mize .......................... 362/311 |
| 6,382,803 B1 | | 5/2002 | Arumugasaamy ........... 359/850 |
| 6,481,130 B1 | | 11/2002 | Wu ............................. 40/546 |
| 6,641,282 B1 | * | 11/2003 | Perlo et al. .................. 362/217 |

* cited by examiner

*Primary Examiner*—Thomas M. Sember
*Assistant Examiner*—Sharon Payne
(74) *Attorney, Agent, or Firm*—Alix, Yale & Ristas, LLP

(57) ABSTRACT

A composite reflecting surface for a linear LED array incorporates a truncated circular parabolic reflector surrounding each LED and a trough axially above the circular parabolic reflectors defined between parallel longitudinal reflecting surfaces. The short circular parabolic reflectors collimate wide angle light from the LED into a direction parallel to the LED optical axis. The longitudinal reflecting surfaces are linear parabolic surfaces altered to improve the vertical spread of the light radiation pattern. Longitudinal convex ribs project inwardly from the basic linear parabolic shape. The convex shape of the ribs "sprays" the light incident upon it in a vertically spread pattern. The composite reflecting surface makes use of light from a linear array of LEDs that would otherwise be wasted.

13 Claims, 12 Drawing Sheets

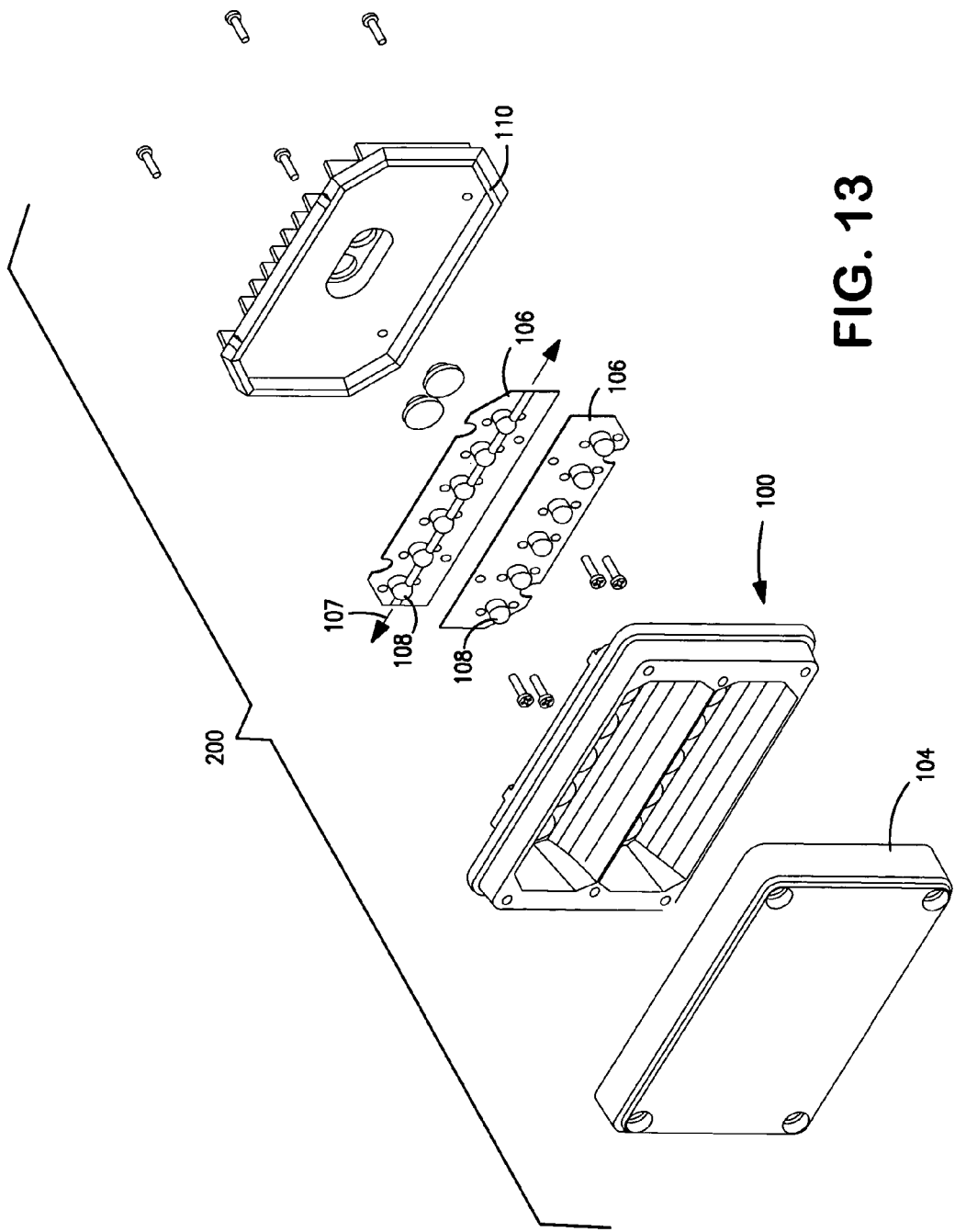

COMPOSITE REFLECTING SURFACE FOR LINEAR LED ARRAY

BACKGROUND OF THE INVENTION

1. Field of the Invention

The present invention relates generally to warning light devices, and more particularly to a device for producing integrated directional light from a plurality of LED light sources.

2. Description of the Related Art

Lights designed to serve illumination, warning or signaling functions must produce light of different intensity, duration and pattern. Within any broad category, such as warning lights, lights designed for a particular application, for example aircraft warning lights, may require a very different intensity and light pattern than a warning light designed for an emergency vehicle such as a police car or fire truck.

The prior art contains numerous examples of alternative light sources, reflectors and lenses arranged to produce particular intensities and distributions of light suited for a particular purpose. Of primary concern to designers of lights are efficiency and accuracy. Efficiency relates to producing the maximum amount of light per unit of applied energy. Accuracy relates to directing that light into the desired pattern with minimal losses. Losses are incurred each time light is reflected or passes through a lens. Light that is not directed to reinforce the desired pattern is effectively lost.

Until recently, light-emitting diodes (LEDs) were extremely limited in the quantity and quality (candela vs. viewing angle) of light produced, rendering them unsuitable for many warning and illumination applications. The viewing angle is the angle, measured with respect to the axis through the center of the lens of the LED, where the light intensity has fallen to fifty (50%) of the on-axis intensity.

Recent advances in LED technology have resulted in LEDs having significantly improved light output both in terms of quantity and quality. High-output, or "high flux" LEDs now produce between 18 and 55 lumens each, making them a practical light source for use in signaling and warning illumination. High-output LEDs have significantly greater luminous flux than previous LEDs, however, the total luminous flux from each LED (15–40 lumens) is still relatively small when compared to light sources such as a halogen bulb. Thus, it is typically necessary to concentrate the light output of multiple LEDs in a compact array to produce a light source with the required luminous intensity and radiation pattern.

The light radiation pattern from an LED depends on the shape of the lens molded around the die of the LED. The most common lens shapes are high dome "lambertian", low dome "batwing" and side emitting. Each of these lenses produces a different light radiation pattern as shown in FIGS. 6a–8b. LEDs with a high dome "lambertian" lens produce a "half globe" of light with a viewing angle of approximately 140 degrees (see FIGS. 7a, 7b). A majority of the light from a lambertian-lens LED is projected within an angle of approximately 30° relative to an optical axis of the lens (0° angular displacement). However, significant quantities of light are radiated at angles exceeding 50° relative to the LED lens optical axis (the above mentioned "half globe").

LEDs are attractive to lighting designers in part because the light they produce is typically of a very narrow spectrum, e.g., of a single pure color, such as red, blue, green, amber, etc. In the prior art, to achieve a colored light output, white light was produced and typically filtered through a colored lens or other colored material, such as a colored glass bulb to produce the desired light color. This approach wasted a large percentage of the available light and consequently the electrical energy used to produce the light, reducing the energy efficiency of the prior art devices. The efficiency of LEDs as producers of colored light is enhanced because no external color filtering is needed.

U.S. Pat. No. 6,318,886 (the '886 patent), assigned to the assignee of the present invention, the entire contents of which are hereby incorporated by reference into this specification, describes a high-flux LED assembly in which an array of LEDs are provided with a reflector surrounding each LED. A conical reflecting surface collects and redirects off-axis (wide angle) light from the LED. The conical reflectors redirect such "wide angle" light out the face of the assembly, increasing the effective light contribution of each LED. The high-flux LED assembly also discloses connecting the conical reflectors with grooves to improve the wide-angle visibility desirable in a warning or signaling light application. By concentrating a number of high-output LEDs in a relatively small area and reflecting the light produced in a desired pattern, a very efficient and effective signaling and/or warning light is provided.

The '886 patent discloses an approach using conical reflectors. While the high-flux LED assembly described in the '886 patent has proved successful for its desired application, further improvements are possible. The conical reflectors disclosed in the '886 patent redirect light incident upon them out the face of the light assembly over a range of angles where the angle of the escaping light depends on the angular relationship between incident light and the reflecting surface. Such an arrangement, while desirably redirecting light out the front face of the assembly, undesirably does so over a range of angles. Some of the reflected light reinforces light output of the LED, while other light is reflected at random angles that fail to reinforce the light output of the LED and is effectively lost. The light pattern produced is essentially a series of bright points of light having somewhat improved wide-angle visibility due to the grooves connecting the conical reflectors.

It is known in the art to use parabolic reflectors to collimate the light output from prior art light sources such as halogen bulbs or xenon flash tubes. U.S. Pat. Nos. 4,792,717 and 4,886,329, both directed to a wide-angle warning light and both assigned to the assignee of the present invention, disclose the use of a parabolic reflector comprised of a linear parabolic section including parabolic dish ends. The reflecting surface has a linear focal axis similar in configuration to the reflecting surface associated with the xenon flash tube light source.

As exemplified by the '886, '717 and '329 patents discussed above, reflectors for light assemblies are typically configured to complement the form of the light source, e.g., point light sources are provided with reflectors having axial symmetry and linear light sources are provided with reflectors having linear symmetry. The conventional approach generally involved matching the reflector to the light source to produce maximum light output from a light assembly.

SUMMARY OF THE INVENTION

A composite reflecting surface for a linear LED array incorporates a truncated circular parabolic reflector surrounding each LED and a trough axially above the circular parabolic reflectors defined between parallel longitudinal reflecting surfaces. The short circular parabolic reflectors collimate wide angle light from the LED into a direction parallel to the LED optical axis. The longitudinal reflecting surfaces are linear parabolic surfaces altered to improve the vertical spread of the light radiation pattern. Longitudinal convex ribs project inwardly from the basic linear parabolic shape. The convex shape of the ribs "sprays" the light incident upon it in a vertically spread pattern.

The composite reflecting surface selectively re-directs light emitted from the LEDs at angles where the light would be dispersed upwardly or downwardly in directions not required for a desired warning light pattern.

An object of the present invention is to provide a new and improved composite reflecting surface configuration that selectively redirects light from a linear array of LEDs to maximize the light traveling in directions which reinforce a specified warning light pattern.

Another object of the present invention is to provide a new and improved composite reflecting surface whose light output is primarily in the form of a wide angle beam.

A further object of the present invention is to provide a new and improved composite reflecting surface that efficiently integrates the light output of a plurality of point source LEDs into a substantially uniform light pattern.

A still further object of the present invention is to provide a new and improved LED light assembly which efficiently uses a high-output LED to produce highly favorable illumination characteristics.

BRIEF DESCRIPTION OF THE DRAWINGS

These and other objects, features and advantages of the present invention will become readily apparent to those skilled in the art upon reading the description of the preferred embodiments, in conjunction with the accompanying drawings in which:

FIG. 13 is a perspective exploded view of a warning light assembly incorporating the reflector of FIG. 1.

DETAILED DESCRIPTION OF AN EXEMPLARY EMBODIMENT

Figure 1:
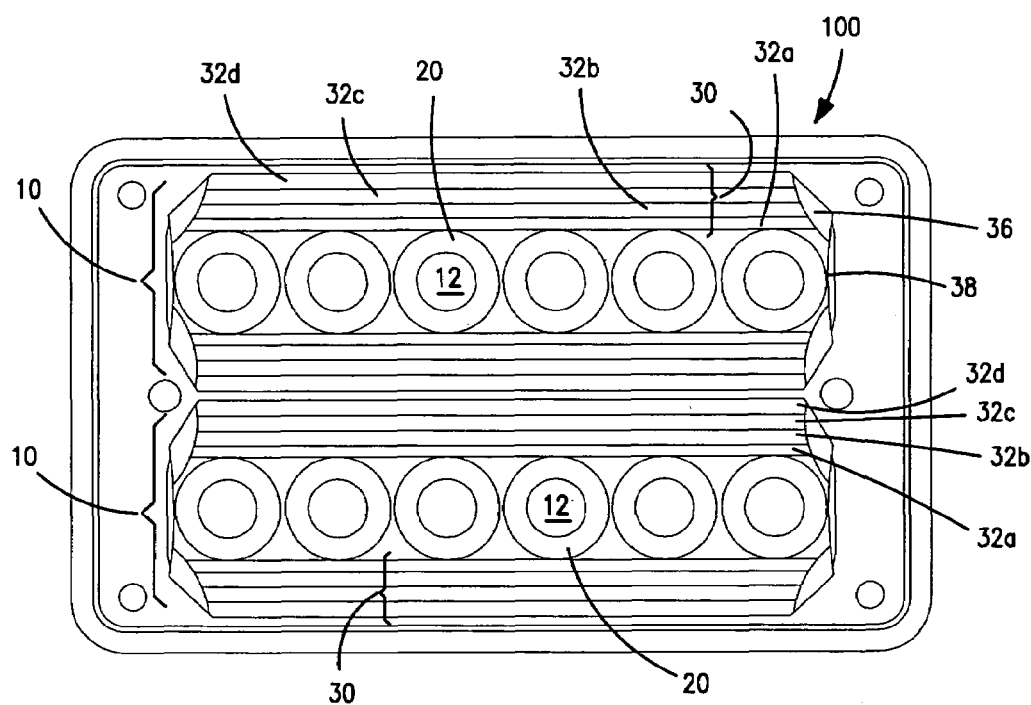
FIG. 1 is a top plan view of a reflector incorporating two composite reflecting surfaces in accordance with aspects of the present invention.
Figure 2:
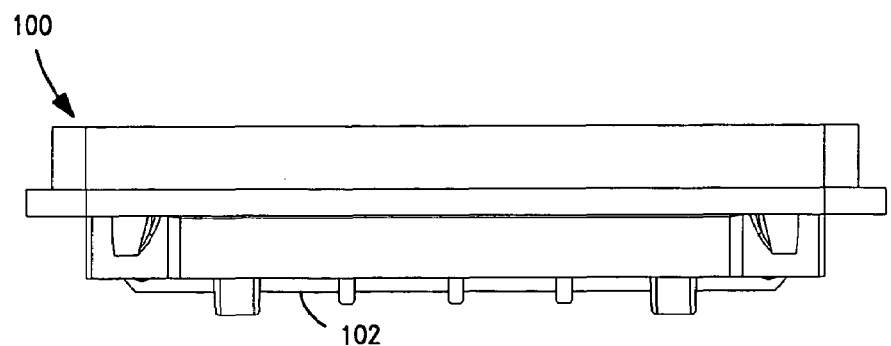
FIG. 2 is an exterior side view of the reflector of FIG. 1.

An exemplary embodiment of a composite reflecting surface in accordance with aspects of the present invention will now be described with reference to the figures. FIGS. 1–4 illustrate a reflector 100 incorporating two composite reflecting surfaces 10. The reflector 100 is for a warning light 200 including two linear arrays 106 of LEDs 108 (see FIG. 13). In this embodiment, the two linear arrays 106 are arranged parallel to each other and extending along the length of the rectangular reflector 100. The back side 102 of the reflector 100 defines locations for securing PC boards carrying the LEDs 108. A lens 104 covers the front of the assembly. A thermally conductive plastic heat sink 110 covers the back of the assembly and provides a thermal pathway for heat generated by LEDs 108.

The back side 102 of the reflector 100 also defines openings 12 for receiving the lenses and bodies of the surface-mount LEDs 108. The back side of the reflector surrounding the LED openings 12 is flattened and the diameters of the LED openings are such that both the lens of the LED and a substantial portion of the body carrying the LED project through the reflector 100. This aspect of the present invention maximizes the distance between the die (the light-emitting portion of the LED) and the reflecting surface 10 defined by the front of the reflector 100. Maximizing this distance allows design of a reflecting surface generally defined by parabolic reflecting surfaces having a longer focal length F (the distance between the vertex of the parabola defining the reflecting surface and the focus of the parabola) than if the opening only admitted the lens of the LED 108. Increasing the focal length of the curve used to define a reflecting surface allows the reflecting surface 10 to be broader and shallower than if it were defined by a parabola with a shorter focal length. A broad, shallow reflecting surface desirably reduces the overall depth of the assembled light unit 200.

Figure 3:
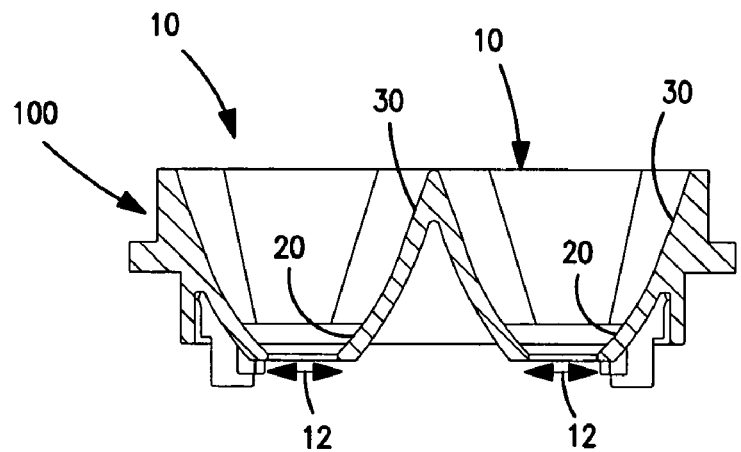
FIG. 3 is a sectional end view of the reflector of FIG. 1.
Figure 4:
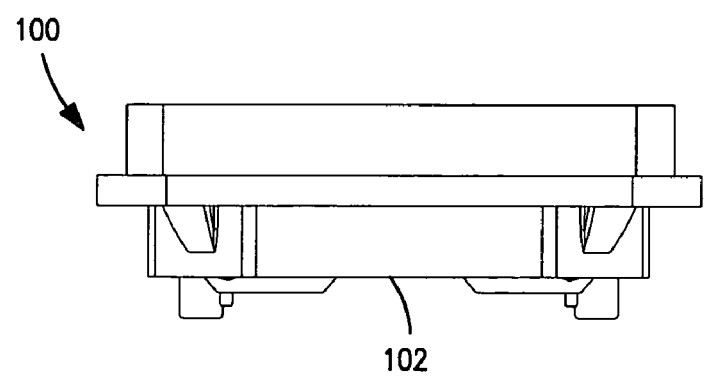
FIG. 4 is an exterior end view of the reflector of FIG. 1.
Figure 5:
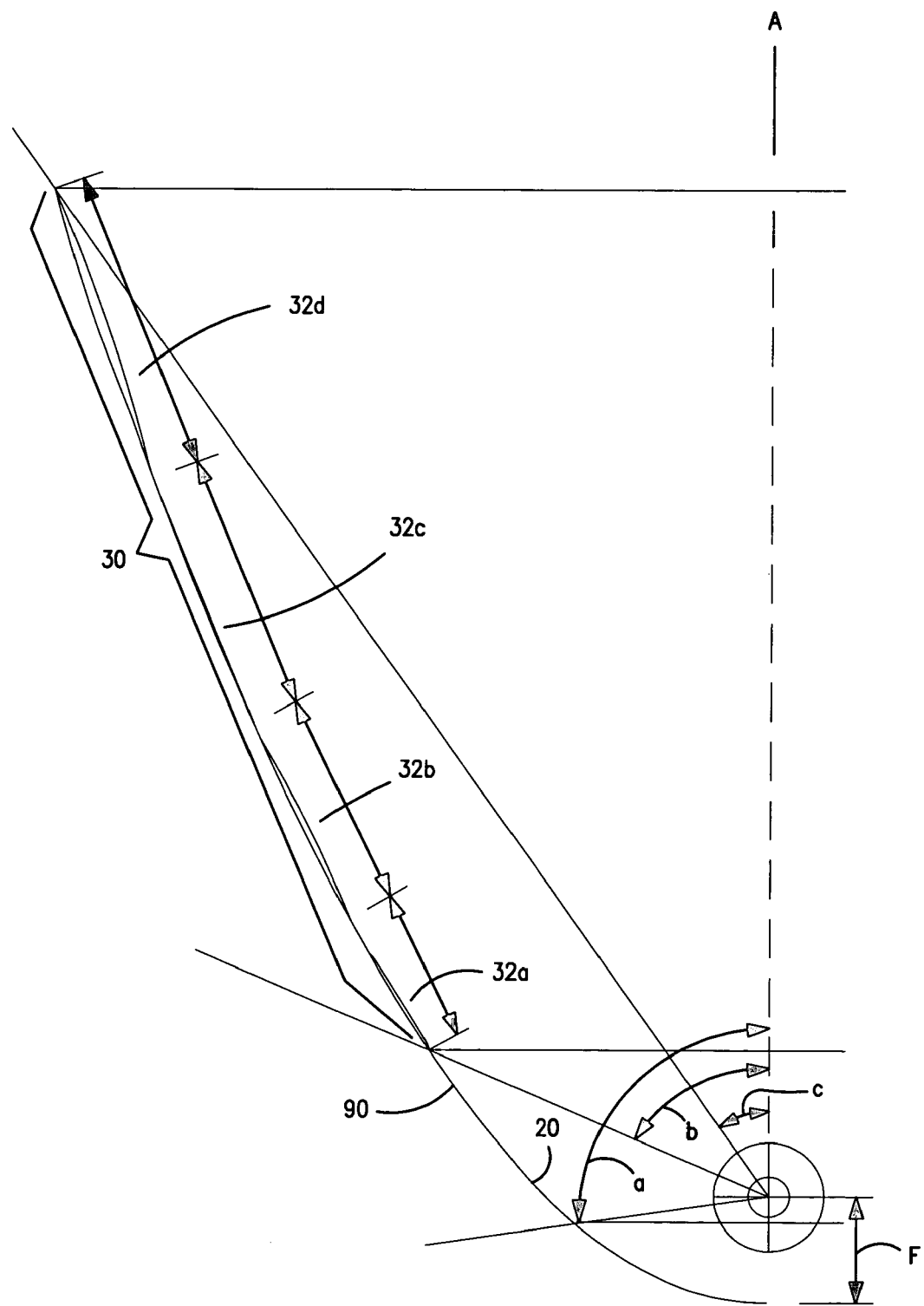
FIG. 5 is a geometric representation of a composite reflecting surface according to aspects of the present invention taken through a diameter of a circular parabolic reflecting surface and perpendicular to the length of the reflecting surface.
Figure 6:
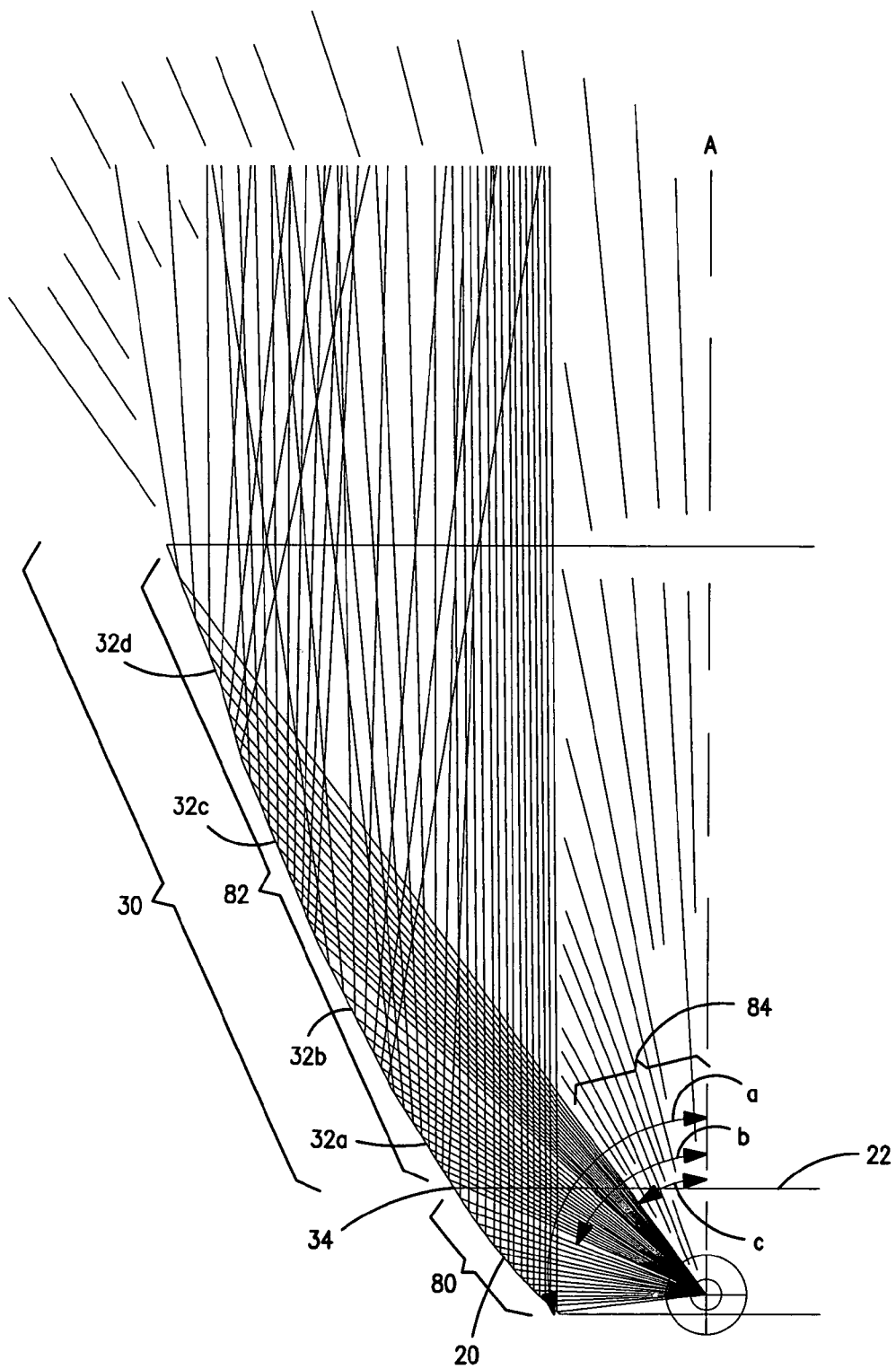
FIG. 6 is the geometric representation of FIG. 5, supplemented with lines indicating light reflecting from the surface.

With reference to FIGS. 1 and 3, each composite reflecting surface 10 includes a circular parabolic reflecting surface 20 surrounding each of the LED openings 12. The truncated parabolic reflecting surfaces begin axially below the height of the die of each LED and extend only a relatively short axial distance above the area of light emission for each LED. The circular parabolic reflecting surfaces 20 collimate a portion of the light emitted from each LED, i.e., redirect that light to a path parallel to the optical axis A of the LED. With reference to FIGS. 5 and 6, the light incident upon the circular parabolic reflecting surface 20 is light emitted at an angle of greater than approximately 66° relative to the optical axis A of the LED to a maximum angle a of approximately 98°. This light will be referred to as "wide angle" light. The portion of light emitted from an LED with a lambertian lens shape at an angle b of greater than approximately 66° relative to the optical axis A is shown at 80 in FIG. 7a. The circular parabolic reflecting surfaces collimate the wide angle light to reinforce the center of the light radiation pattern as best illustrated in FIG. 6.

If the circular parabolic reflecting surfaces were allowed to extend to the full height of the reflector body, they would intersect and significantly overlap each other. Further, the vast majority of the light emitted from the LEDs would be collimated and reoriented into a direction parallel to the optical axis of the LED. Collimating too much of the light produces a beam visible over a very narrow angle directly in front of the reflector. Such a light pattern is undesirable for a warning light used in emergency, police, fire vehicles.

Specifications for emergency vehicle warning lights require that the light radiation pattern provide a minimum intensity over a wide horizontal angle in front of the warning light and over a somewhat narrower vertical angle centered on the warning light.

The composite reflecting surface is configured to selectively redirect light from the LEDs to reinforce the desired light pattern. In the case of a vehicle warning light, the desired light radiation pattern is a wide angle of approximately 90° in a horizontal plane (45° to the right and left of the warning light) and a relatively narrow angle of approximately 20° in a vertical plane (10° above and below the warning light). Some of the light emitted at angles of between approximately 35° and 66° relative to the optical axis A of the LED 108 will desirably reinforce the required wide angle light radiation pattern in a horizontal plane. Other components of this light (82 in FIGS. 6 and 7a) have a path with a vertical component beyond the required vertical spread of the specified light radiation pattern. Longitudinal reflecting surfaces 30 define a horizontal trough axially above the row of circular parabolic reflecting surfaces 20 to selectively re-direct portions of this light 82 to reinforce the desired wide-angle beam light radiation pattern.

With reference to FIGS. 3, 5, 6, and 12 the trough is defined by two parallel, longitudinal reflecting surfaces 30 arranged with a bottom edge 34 tangent to an upper rim 22 of the circular reflecting surfaces 20. As shown in FIGS. 5 and 6, in section the longitudinal reflecting surfaces 30 are substantially parabolic in configuration. The parabola 90 defining the basic configuration of the longitudinal reflecting surfaces 30 is an extension of the parabola defining circular parabolic reflecting surfaces 20.

The basic shape of the longitudinal reflecting surfaces 30 defined by the parabola 90 projected along a line 107 passing through the areas of light emission of the LEDs 108 to define a linear parabolic surface. A linear parabolic surface would re-orient light incumbent upon it into a plane parallel with the optical axes of the LEDs. Such a wide-angle beam undesirably lacks vertical spread. An aspect of the present invention relates to modifying a linear parabolic reflecting surface to enhance the vertical spread of the light pattern. The reflecting surface embodiment shown in FIGS. 1, 3, 5, 6, and 12 illustrates four convex longitudinal ribs 32a–32d. As shown in FIG. 5, the convex ribs project from the parabola 90 into the trough. The axially upper and lower longitudinal edges of each rib touch the parabola 90.

In the illustrated reflecting surface, each longitudinal convex rib has a different width (measured perpendicular to the length of the reflecting surface) and is defined by a different radius of curvature. Table 1 shows the width and radius of curvature for each longitudinal convex rib.

TABLE 1

| Rib | Width | Radius of Curvature |
|---|---|---|
| 32a | .166" | 1.73" |
| 32b | .199" | 1.42" |
| 32c | .233" | 1.36" |
| 32d | .268" | 1.5" |

The radius of curvature for each rib 32a–32d are selected to spread light incumbent upon them to enhance the vertical spread of the light pattern from the reflecting surface 10. The dimensions and curvatures selected for the ribs may be altered without departing from the spirit and scope of the present invention. Ribs of similar or identical width and curvature are intended to be encompassed by the present invention.

As shown in FIGS. 5 and 6, light emitted from the LED at an angle c of less than approximately 35° relative to the optical axis A is not incident upon the composite reflecting surface 10 and passes out of the assembly 200 without change of direction. This "axially close" light is shown at reference numeral 84 in FIGS. 6 and 7a. Axially close light 84 generally reinforces the desired light radiation pattern and its path is therefore not altered.

In the illustrated embodiment, the lateral ends of each reflecting surface 10 are enclosed by reflecting surfaces 36, 38. The shape, size and angular orientation of these surfaces 36, 38 are selected to re-direct light incumbent upon them into the desired light pattern. Alternative-end configurations including a parabolic dish end reflecting surface and an open-end are possible.

For most purposes, the desired warning light pattern extends over an arc of 90° centered on the warning light in a horizontal plane and an angle of 20° in a vertical plane centered on the warning light. Light from the LEDs 108, which would travel in a path beyond these angles, is effectively lost because it does not help to meet or strengthen the warning light pattern within the specified angles. The combination of truncated circular parabolic reflecting surfaces and modified parabolic longitudinal reflecting surfaces produces an aesthetically pleasing pattern of light emission where light from the LEDs is selectively redirected when necessary to reinforce a wide-angle warning light pattern. The light pattern produced is superior to that of either circular parabolic reflecting surfaces alone or an open parabolic trough.

Figure 7:
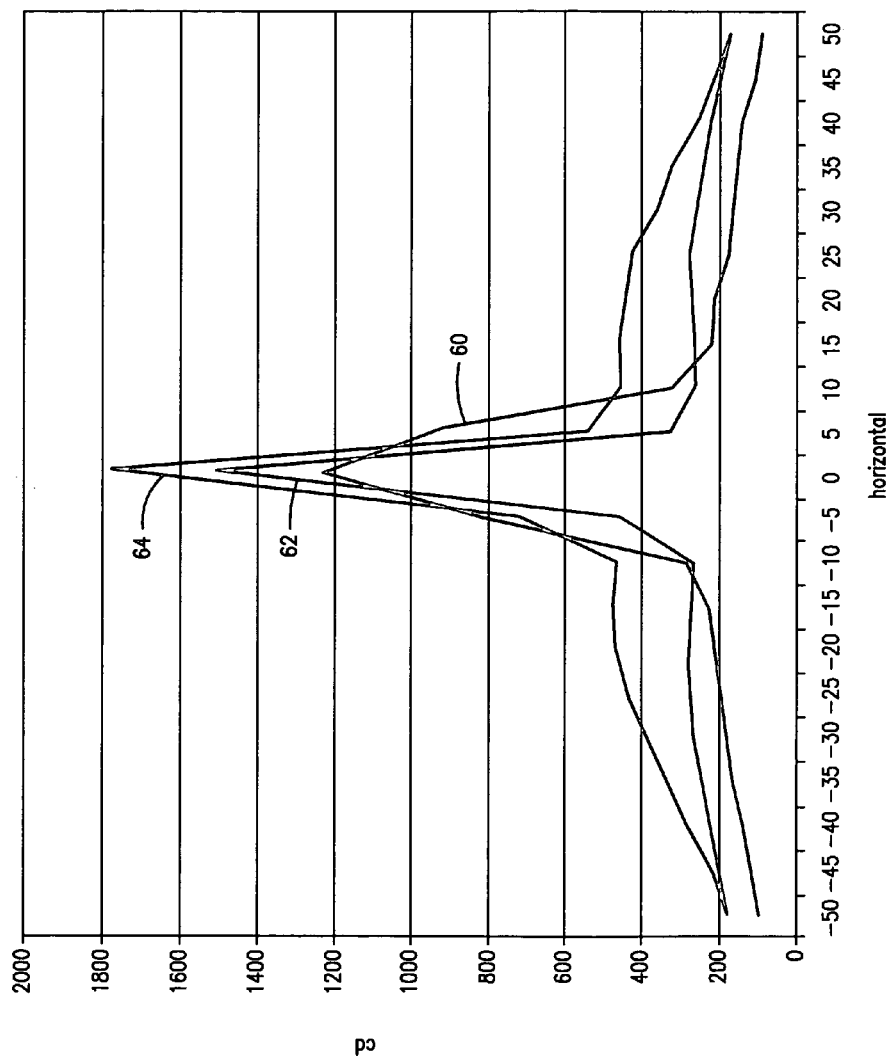
FIGS. 7–11 are graphs of light radiation patterns from identical LED arrays equipped with an open linear parabolic trough reflector (curve 62), a linear parabolic trough reflector equipped with a collimating lens (curve 64) and a composite reflector according to aspects of the present invention (curve 60)
Figure 7B:
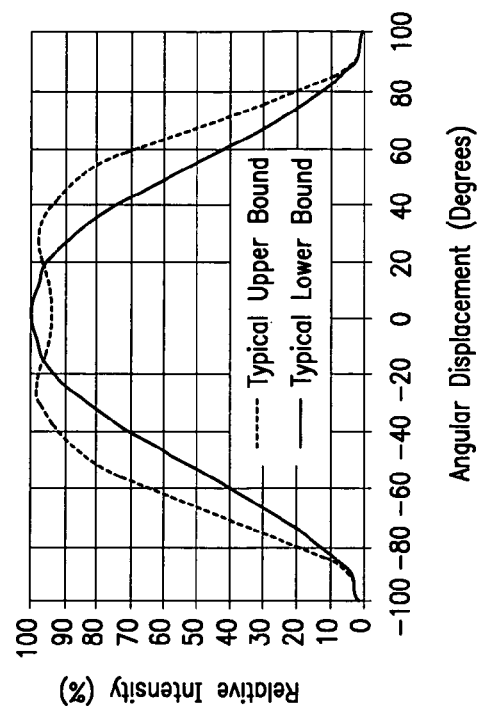
FIGS. 7a and 7b are graphs of the typical representative spatial radiation pattern from Luxeon® emitters with a high dome lens shape.
Figure 7A:
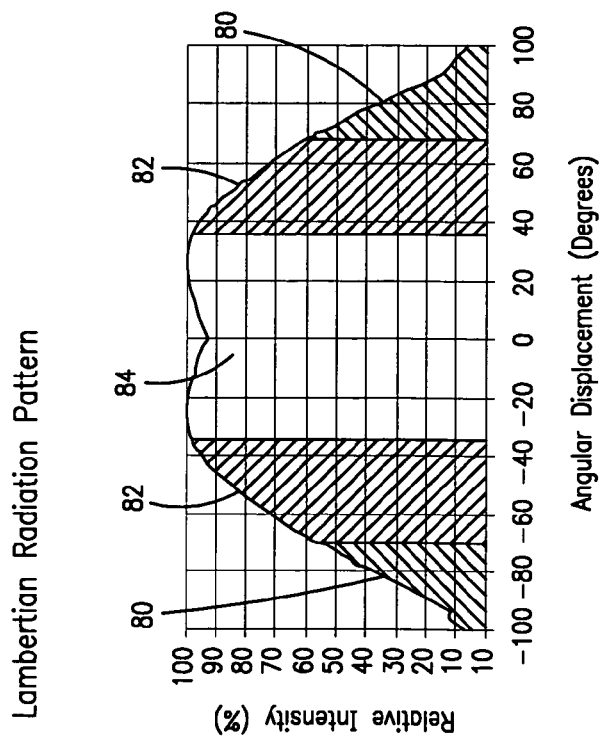

FIGS. 7–11 illustrate light intensity measurements from identical linear LED arrays employing alternative reflecting surfaces. FIG. 7 shows the light emission pattern in candela in a horizontal plane centered on the reflecting surfaces over a range of angles extending from 50° to the right to 50° to the left of the reflector. Curve 62 is the light emission pattern from an open parabolic trough. In the open parabolic trough, the parabolic reflecting surface is defined by a parabola projected along a line passing through the dies of the LED array. The reflecting surface at the ends of the array is defined by the same parabola rotated around the optical axis of the end LED in the array. This light pattern shows a peak intensity directly in front of the reflecting surface of approximately 1,450 candela. Curve 64 illustrates the light emission pattern of the linear parabolic reflector of curve 62 provided with a collimating lens installed over the optical axes of the LEDs in the array. The collimating lens is configured to collimate axially close light from the LEDs that would otherwise pass from the reflector uninterrupted. Curve 64 shows that the collimating lens provides a greater peak intensity of approximately 1,800 candela and somewhat improved wide-angle light intensity. The peak intensity in a horizontal plane for these reflectors far exceeds the required intensity. FIGS. 8–11 illustrate that the peak intensity for these reflecting surfaces drops dramatically at angles of 5 and 10 degrees above and below the horizontal plane. This reflects the lack of vertical spread from the linear parabolic trough reflecting surface.

Figure 8:
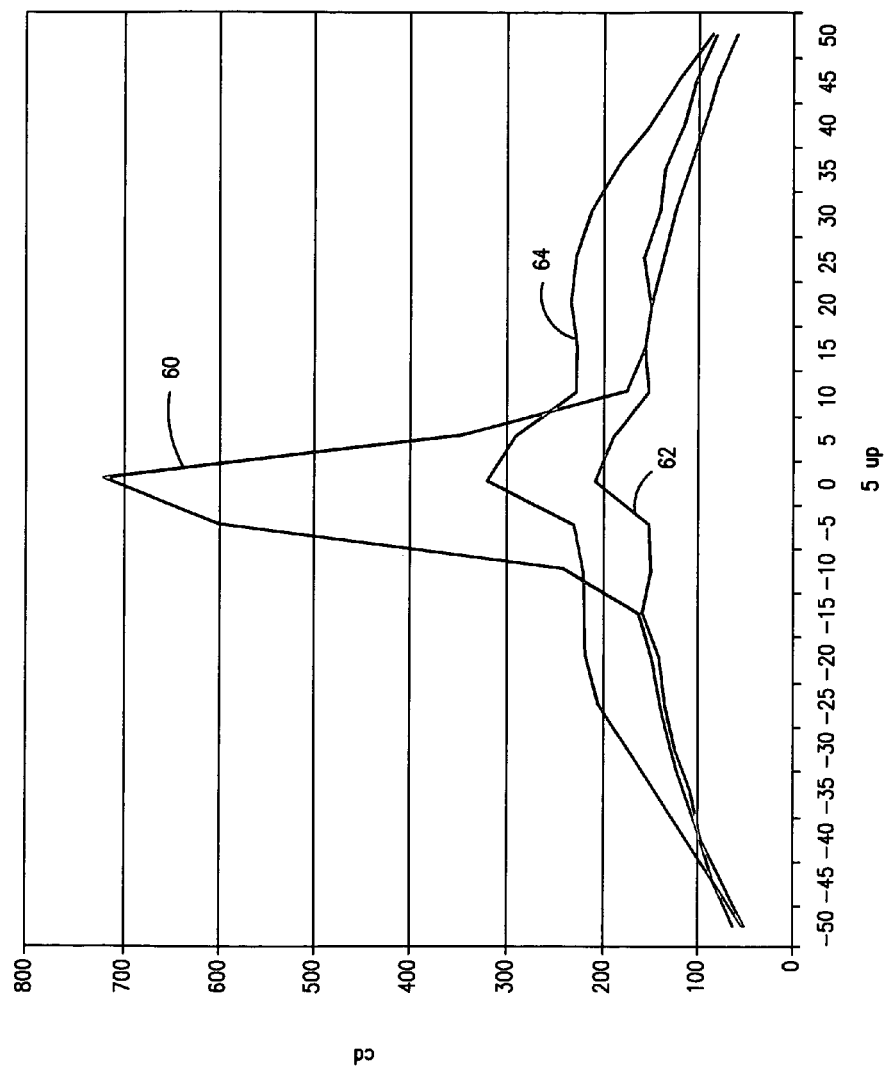
Figure 9:
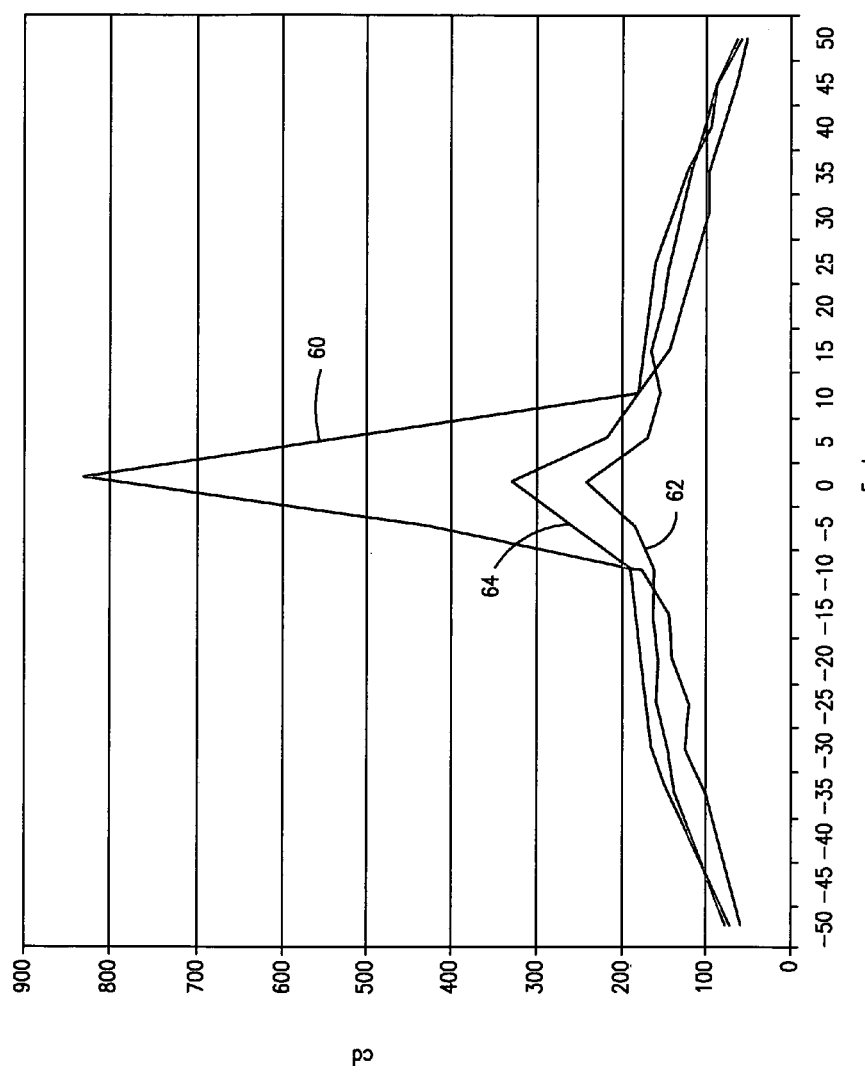
Figure 10:
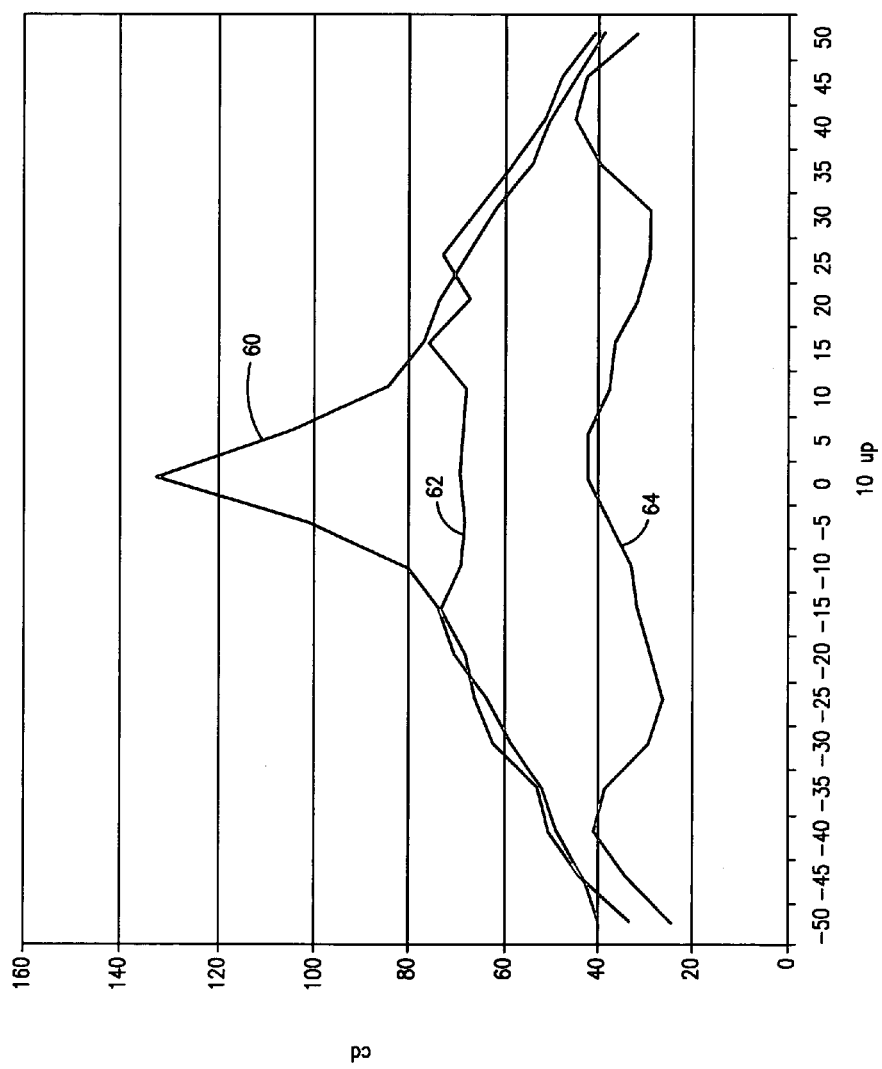
Figure 11:
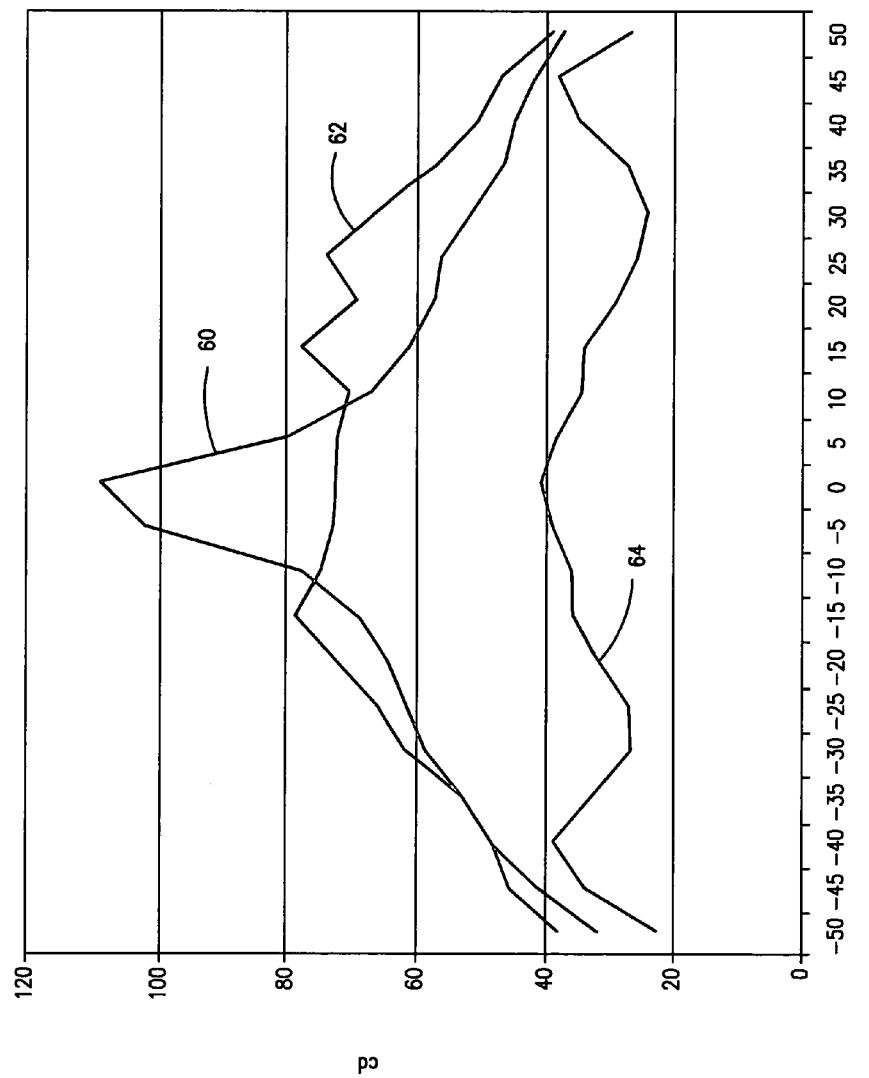
Figure 12:
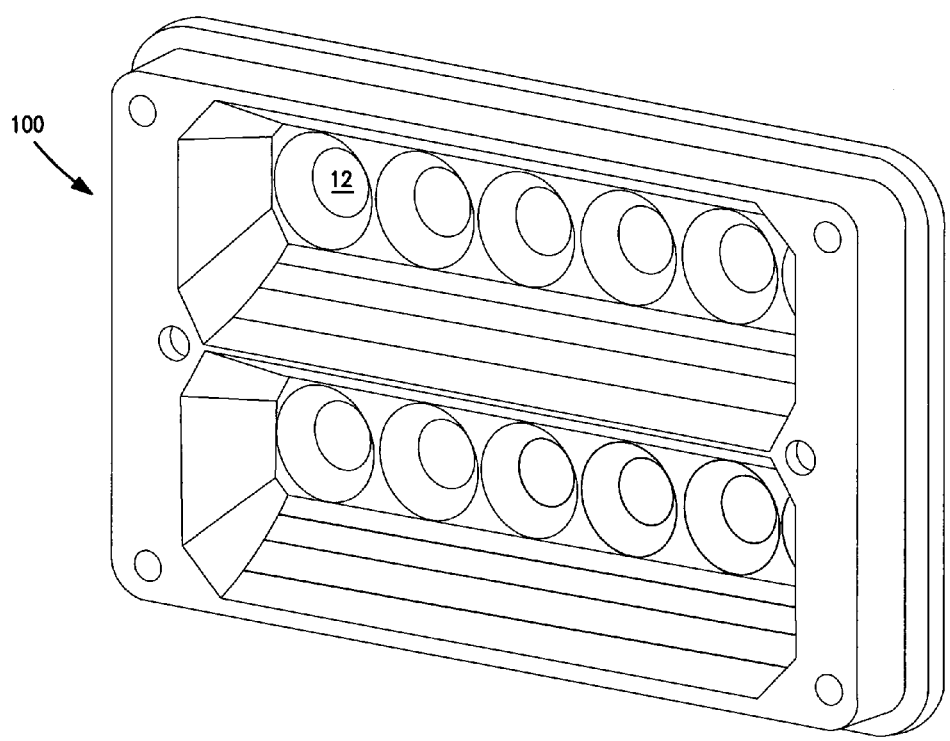
FIG. 12 is a perspective view of the reflector of FIG. 1.

Curve 60 illustrates the light radiation pattern from an LED array equipped with a composite reflecting surface 10 in accordance with aspects of the present invention. The peak intensity of the composite reflector array is approximately 1,200 candela in a horizontal plane. FIGS. 8 and 9 illustrate a radical increase in light pattern intensity from an array equipped with a composite reflector at an angle of 5° up and down relative to a horizontal plane of FIG. 7. FIGS. 10 and 11 illustrate a similarly dramatic improvement in light pattern intensity at angles of 10° up and 10° down relative to the horizontal plane. The gains shown in FIGS. 8–11 are made by capturing and redirecting light from an identical LED array. Further, the composite reflector eliminates the need for a lens to re-direct any portion of the radiation pattern. A more effective warning light is produced without increasing the number of light-producing components or their power consumption.

While an illustrated embodiment of the foregoing invention has been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. A composite reflector for a linear array of LEDs having a length, each of said LEDs having an optical axis extending from an area of light emission, said composite reflector comprising:
    a row of substantially circular concave reflecting surfaces, each said concave reflecting surface substantially surrounding one said area of light emission and extending axially and outwardly to an upper edge; and
    a pair of longitudinal reflecting surfaces extending axially and outwardly from lower limits adjacent said upper edges and laterally spaced apart by said row of substantially circular reflecting surfaces to define a trough axially thereabove.

2. The composite reflector of claim 1, wherein each said longitudinal reflecting surface comprises a plurality of longitudinally extending convex ribs.

3. The composite reflector of claim 1, wherein each said longitudinal reflecting surface comprises a plurality of longitudinally extending convex ribs arranged on a parabola projected along the length of said array.

4. The composite reflector of claim 1, wherein each said longitudinal reflecting surface comprises a plurality of longitudinally extending convex ribs, each said rib having a length and a different width.

5. The composite reflector of claim 1, wherein each said longitudinal reflecting surface comprises a plurality of longitudinally extending convex ribs, each said rib having a length and defined by a radius of curvature perpendicular to said length.

6. The composite reflector of claim 2, wherein the convex shape of each rib is defined by a different radius of curvature.

7. The composite reflector of claim 1, wherein each said substantially circular concave reflecting surfaces is defined by a parabola rotated about said optical axis.

8. The composite reflector of claim 7, wherein said parabola has a focus coincident with said area of light emission.

9. A warning light comprising:
    an array of LEDs, each said LED comprising a die from which light is emitted and a lens covering said die, said lens having an optical axis originating at said die, said LEDs being arranged along a line extending through said dies to form a linear LED array having a length; and
    a reflector body having a back side defining a plurality of openings for receiving the lens of each LED and a front side defining a composite reflecting surface comprising:
        a row of concave reflecting surfaces, each said concave reflecting surface defined by a parabola having a focus coincident with the die of a received LED and rotated about the optical axis of the received LED, said reflector extending axially above said LED to a rim having a diameter; and
        a pair of longitudinal reflecting surfaces extending upwardly and outwardly from a lower edge substantially tangent to said rims, said longitudinal reflecting surfaces being laterally separated from each other by a distance substantially equal to the diameter of said rims, said pair of longitudinal reflecting surfaces extending substantially the length of said linear LED array and defining a trough above said row of concave reflecting surfaces.

10. The warning light of claim 9, wherein each said longitudinal reflecting surface comprises a plurality of convex ribs.

11. The warning light of claim 9, wherein each said longitudinal reflecting surface is a linear substantially parabolic surface defined by said parabola projected along the line extending through said dies.

12. The warning light of claim 9, wherein each said longitudinal reflecting surface comprises a plurality of convex ribs, each rib having a different width measured perpendicular to said array and along said reflecting surface.

13. The warning light of claim 9, wherein each said longitudinal reflecting surface comprises a plurality of ribs with a convex surface defined by a different radius of curvature.

* * * * *